United States Patent [19]

Shiiki et al.

[11] 4,411,716
[45] Oct. 25, 1983

[54] AMORPHOUS ALLOYS FOR MAGNETIC HEAD CORE AND VIDEO MAGNETIC HEAD USING SAME

[75] Inventors: Kazuo Shiiki, Shiroyamamachi; Shigekazu Otomo, Hachioji; Mitsuhiro Kudo, Hamuramachi; Takeshi Kimura, Kokubunji; Noriyuki Kumasaka, Ome; Hideo Fujiwara, Tachikawa, all of Japan

[73] Assignees: Hitachi, Ltd.; Hitachi Metals, Ltd.; Research Development Corporation of Japan, all of Tokyo, Japan

[21] Appl. No.: 282,805

[22] Filed: Jul. 13, 1981

[30] Foreign Application Priority Data

Jul. 11, 1980 [JP] Japan .................................. 55/93987

[51] Int. Cl.³ ............................................. C22C 33/00
[52] U.S. Cl. .................................. 148/403; 148/31.55; 360/125
[58] Field of Search ...................... 360/119, 125, 126; 148/31.55, 31.57, 403

[56] References Cited

U.S. PATENT DOCUMENTS 4,079,430  3/1978  Fujishima et al. .................. 360/126
4,179,719  12/1979  Imamura et al. ..................... 360/112
4,231,816  11/1980  Cuomo et al. ..................... 75/123 E

FOREIGN PATENT DOCUMENTS 56-146849  6/1981  Japan .

*Primary Examiner*—John P. Sheehan
*Attorney, Agent, or Firm*—Antonelli, Terry & Wands

[57] ABSTRACT

Amorphous alloys for magnetic head cores of a composition which is expressed by a general formula $(Co_xFe_{1-x})_aCr_bSi_cB_{1-a-b-c}$ wherein the value of x is in the range between 0.925 and 0.97, the value of a is in the range between 0.74 and 0.76, the value of b is in the range between 0.005 and 0.03 and the value of c is in the range between 0.06 and 0.18, and wherein $a+b+c \leq 0.94$, and a magnetic head for video equipment wherein at least one foil of one of the aforesaid alloys having a width of below 30 µm is used. The amorphous alloys of the aforesaid composition are high in permeability, high in saturation magnetic flux density and low in magnetostriction. A magnetic head for video equipment using such alloys has excellent characteristics in that it has high recording and reproducing characteristics and a high output/noise ratio and shows little magnetic after effect.

15 Claims, 16 Drawing Figures

AMORPHOUS ALLOYS FOR MAGNETIC HEAD CORE AND VIDEO MAGNETIC HEAD USING SAME

BACKGROUND OF THE INVENTION

This invention relates to amorphous alloys for a magnetic head core and a magnetic head using same, and more particularly it deals with a magnetic head of high performance and prolonged service life including a part formed of amorphous alloy materials, for video equipment.

Heretofore, alloy materials, such as ferrite materials including Mn-Zn ferrite and Sen-alloy, have been in use as materials for forming magnetic heads. These materials are not considered ideal materials for producing magnetic heads. For example, Mn-Zn ferrite has high permeability in high frequency region but tends to develop distortion during recording because of low saturation magnetic flux density and to produce noise during playback because of high magnetostriction. Sen-alloy has a high saturation magnetic flux density and a low magnetostriction. However, owing to its low permeability in high frequency region, it has the disadvantage of being low in playback efficiency. In magnetic heads of the prior art, attempts have been made to eliminate the defects of the material as much as possible by optimizing the structure design. However, their performance has been far from being ideal. Magnetic tapes that have hitherto been widely in use have raised no serious problems in practical use because they are relatively low in coercive force.

In order to improve recording density to increase the performance of equipment and obtain a compact size in video equipment, metal powder tape of high coercive force has recently been developed and already used for audio equipment. It is assumed that it will be put to practical use for video equipment in the near future. Research that has been conducted shows that difficulties would be encountered in making the best use of the characteristics of the metal powder tape by combining the magnetic head of ferrite material of the prior art with the metal powder tape of high coercive force because of poor performance of the magnetic heads of ferrite material.

Amorphous magnetic alloys have in recent years been discovered. They have excellent characteristics as materials for magnetic heads, and it is generally expected that they will prove ideal materials for producing heads. Amorphous alloys, which are characterized in that the atoms constituting them are not arranged in an orderly manner with a long range order as in crystals but in what is referred to as a vitreous state in which they are in frozen liquid condition, are expected to show unique properties lacked in materials of the prior art.

Research conducted by us has shown that not all the amorphous alloys have excellent characteristics that render them suitable for use as materials for producing magnetic heads and that materials of specific dimensions of such alloys that are limited in composition can be used for producing magnetic heads. Particularly, it has been revealed that only the magnetic heads of special design compatible with the specific use exhibit much better performance than magnetic heads of the prior art.

For example, as shown in Japanese Patent Application Laid-Open Publication No. 91014/74, it is possible to produce amorphous alloys of a very wide range of components in composition. However, the majority of such alloys are low in saturated magnetic flux density and not suitable for forming magnetic heads. Also, the majority of such alloys show deterioration in characteristics due to the stress applied thereto during the process of forming same into magnetic heads even if they exhibit excellent magnetic characteristics as materials. Amorphous alloys tend to have magnetic after-effect due to the instability of their structure, even if they do not much suffer the aforesaid disadvantages. Thus it has hitherto been believed that it is impossible to put amorphous alloys into practical use as materials for producing magnetic heads.

As described in Japanese Patent Application Laid-Open Publication No. 94211/76, magnetic heads formed of amorphous alloys are known. However, the magnetic heads formed of such novel materials could not exhibit better performance than magnetic heads formed of materials of the prior art unless they have a special head construction.

The following references are cited to show the state of the art: (i) Japanese Patent Application Laid-Open Publication No. 91014/74; (ii) Japanese Patent Application Laid-Open Publication No. 65395/76; and (iii) Japanese Patent Application Laid-Open Publication No. 94211/76.

SUMMARY OF THE INVENTION

Accordingly the invention has as its general object the provision of amorphous alloys for producing magnetic head cores and a magnetic head of high performance using such cores that eliminate the aforesaid problems encountered in the prior art. The invention has as its specific object the provision of amorphous alloys of high permeability, high saturated magnetic flux density and low magnetostriction and a magnetic head for video equipment using such amorphous alloys for use on frequencies above 200 KHz which has high magnetic recording and reproducing characteristics, a high output to noise ratio and low magnetic after-effect.

To accomplish the aforesaid objects, the invention provides amorphous alloys for forming magnetic head cores having a composition which is expressed by a general formula $(Co_xFe_{1-x})_aCr_bSi_cB_{1-a-b-c}$, wherein the value of x is in the range between 0.925 and 0.97, the value of a is in the range between 0.74 and 0.77, the value of b is in the range between 0.005 and 0.03 and the value of c is in the range between 0.06 and 0.18, and wherein $a+b+c \leq 0.94$.

Amorphous alloys of any composition wherein the value of x is not in the aforesaid range are not desirable for forming magnetic head cores because they have high magnetostriction, so that their permeability would be greatly reduced as, for example, by molding with resin for fabricating head and they would show marked deterioration in magnetic characteristics due to working done for forming magnetic heads. The value x is more preferably in the range between 0.93 and 0.95.

Amorphous alloys of any composition wherein the value of a is below 0.74 are not desirable because their saturation magnetic flux density is below about 7 KG. With a composition in which the value of a is over 0.77, the alloys would show a sudden reduction in permeability $\mu_{5M}$ at 5 MHz to a level below about 250 with an increase in the value of a. Such alloys are not desirable.

When the composition has a value of below 0.005 for b, the addition of Cr shows no appreciable effect in raising crystallization temperature. When the value of b exceeds 0.03, the saturation magnetic flux density of the alloys becomes below about 7 KG. Neither of these alloys is desirable. When the value of b is in the range between 0.01 and 0.03, the addition of Cr has marked effect in raising crystallization temperature and the stability of magnetic head characteristics increases. In addition, no corrosion by water or grinding liquid occurs. No evidence of corrosion was found when magnetic heads formed of amorphous alloy of this range of values of b was used over a prolonged period of time.

Si is an element essential to produce an amorphous state. An increase in its amount causes a rise in permeability $\mu_{5M}$ on 5 MHz. However, when the value of c is below 0.06, the permeability $\mu_{5M}$ is below 250 which is not desirable, and difficulties are rather experienced in producing an amorphous state. When the value of c exceeds 0.18, it becomes difficult to produce an amorphous state and the crystallization temperature drops below about 450° C., which are not desirable. With the values of 0.14 and 0.12 for c, crystallization temperatures are about 480° C. and about 500° C. respectively. When the value of c is below 0.12, crystallization temperature shows substantially no change. When the value of c exceeds 0.1, the permeability $\mu_{5M}$ is over about 270. Thus a more preferable range of the values of c is between 0.06 and 0.14, and the most preferable range is between 0.1 and 0.12.

B is also essential to produce an amorphous state. To readily produce an amorphous state makes it necessary that the value of $1-a-b-c$ be over 0.06. This value is more preferably over 0.1. Stated differently, it is necessary that $a+b+c \leq 0.94$. It is preferable that $a+b+c \leq 0.90$.

Alloys of the aforesaid composition are preferably subjected to heat treatment at a temperature over 350° C. and below the crystallization temperature, to improve their magnetic characteristics. The crystallization temperature, which may vary depending on the composition, is in the range between 450° and 500° C. Heat treatment is preferably carried out for 5 to 60 minutes.

The magnetic head for video equipment according to the invention which comprises two members of magnetic material of high permeability juxtaposed against each other with a gap existing therebetween has at least a portion near the gap of at least one of such members formed of an alloy according to the invention which is essentially amorphous, such alloy being in the form of at least one sheet of alloy foil of a thickness below 30 μm.

When the alloy foil has a thickness exceeding 30 μm, the permeability $\mu_{5}M$ is below 250 which is not desirable.

The alloy foil constituting a portion of at least one of the members near the gap should be at least one in the number of sheet, and may be plural in number. When a plurality of sheets of alloy foil are used, it is essential that the sheets of alloy foil be superposed one over another while being electrically insulated from one another. Adhesive layers for adhering the sheets of alloy foil to one another can be used concurrently as insulating layers. However, the sheets of alloy foil may be first formed with insulating layers thereon and then adhered to one another. Adhesives used may include those of the organic material base, low melting point glass including Pb containing glass, etc.

The portion of at least one member of magnetic material having high permeability located in the vicinity of the gap, as referred to hereinabove, is a portion that performs effective recording on a magnetic recording medium with respect to the direction of travel of the magnetic recording medium. Such portion may vary depending on the construction of the magnetic head, the material of the core and the material of the recording medium. When necessary, the exact location of such portion may be determined by simple experiments. It is within the range of track width with respect to a direction which is parallel to a surface facing the magnetic recording medium and perpendicular to the direction of movement of the magnetic recording medium. With respect to a direction which is perpendicular to the surface facing the magnetic recording medium, such portion is within the range that defines an effective gap and may in many cases be in the range between the surface facing the magnetic recording medium and the neighborhood of the tip of the window for the coils.

As is well known, magnetic heads are in many applications formed with cut-away parts in the magnetic core near the gap. Such magnetic heads are usually referred to as narrow tracking type heads. In the magnetic head according to the invention, such cut away parts may be formed in the magnetic core with advantage.

The track width is preferably such that the ratio of the track width to the thickness of the magnetic core is below 0.7. When the ratio exceeds 0.7, the recording and reproducing characteristics of the magnetic head according to the invention would be lower than those of narrow tracking type magnetic heads of the prior art that use ferrite material.

The magnetic head according to the invention preferably has an effective gap length of below 1.0 μm in the gap. When the effective gap length exceeds 1.0 μm, the recording and reproducing characteristics would be below those of the combination of a narrow tracking type magnetic head using ferrite material with $\gamma$-Fe$_2$O$_3$ magnetic tape of the prior art. If the effective gap length is below 0.6 μm, the recording and reproducing characteristics would be further improved, enabling better results to be achieved.

In the magnetic head according to the invention, a portion of the head located in the vicinity of the gap has only to be constituted by the aforesaid alloy foil, and only one of the two members of magnetic material of high permeability juxtaposed against each other with the gap existing therebetween has only to be constituted by the aforesaid alloy foil while the other member may be formed of another type of magnetic material. Stated differently, a portion other than that near the gap may be constituted by other material than the aforesaid alloy foil. Other material than the aforesaid alloy foil may be one that has high wear resistance for increasing the wear resistance of the surface of the magnetic head facing the magnetic recording medium, or one that has high permeability for reducing the magnetic resistance of the back core portion and increasing the recording and reproducing characteristics, or one that combines the aforementioned two characteristics. It goes without saying that such material concurrently performs the functions of supporting and protecting the portion constituted by the aforesaid alloy foil. One material other than the aforesaid alloy foil that has high wear resistance may be nonmagnetic ferrite or an amorphous alloy of high wear resistance, such as Fe-Cr-Si-B alloy.

A material of high permeability may be Sen-alloy, for example, and a material that combines the two characteristics may be a ferrite of high permeability, such as Mn-Zn ferrite, Ni-Zn ferrite, etc. The magnetic head according to the invention may also be formed of the aforesaid alloy foil in a portion near the gap, a material of high wear resistance in a portion facing the magnetic recording medium except for the vicinity of the gap, and a material of high permeability other than the aforesaid alloy foil in the back core portion.

In the magnetic head according to the invention, the constituting elements and their technical characteristics other than the aforesaid portions may be as described in the literature concerning magnetic heads of the prior art.

The aforesaid essentially amorphous alloy is such alloy that shows no sharp peak inherent in crystals in a diffraction pattern obtained by a well known ordinary X-ray diffraction process. Such alloy may prove to partly contain minuscule crystalline ingredients upon closer observation made by means of a more sensitive observation process, but it is generally referred to as an amorphous alloy.

The permeability exhibited by the amorphous alloys of the aforesaid composition used with the magnetic head according to the invention shows no substantial magnetic after-effect when used in a frequency range above about 200 KHz. However, when used in a frequency range below about 200 KHz, their permeability shows a drop with time which is not desirable. Thus the magnetic head according to the invention should be used in a frequency range above 200 KHz.

The magnetic head according to the invention exhibits good characteristics when used with commonly used magnetic tape, such as $\gamma$-$Fe_2O_3$ magnetic tape or $CrO_2$ magnetic tape. It is expected that when used with tape of high coersive force, such as metal powder tape, which is now under development and expected to be put to use in the future, the magnetic head according to the invention will exhibit much better performance characteristics than magnetic heads of the prior art, thereby contributing to an increase in the performance of video equipment and a reduction in the size and weight thereof.

The present invention has been able to solve the various technical problems experienced by magnetic heads of the prior art by providing a magnetic head which incorporates therein the aforesaid composition of amorphous alloys and aforesaid processing of the material while optimizing the use and construction of the magnetic head. It is only by virtue of these structural features combined with the superiority of the material that the magnetic head according to the invention shows better performance than magnetic heads of the prior art.

DETAILED DESCRIPTION OF THE PRESENTLY PREFERRED EMBODIMENTS

Example 1

In this example, an amorphous alloy was produced by a method which is generally referred to as a single roller method. A roll made of copper having a diameter of 300 mm of a width of 50 mm was rotated at an RPM of about 2000, and an alloy in a liquid state prepared in a desired composition, heated and melted beforehand was projected against the outer periphery of the roll, so as to form a film of the alloy which was allowed to set. By suitably controlling the RPM of the roll and the amount of the liquid alloy projected against the roll, it is possible to obtain an amorphous alloy of a desired thickness. By varying the material of the roll and the atmosphere in which the operation is performed, the nature of the amorphous alloy can be somewhat varied. The single roller method is a method suitable for producing an amorphous alloy on a commercial basis. Other known methods for producing amorphous alloys include a double roller method, a centrifugal method and a sputtering method. These methods have different characteristics, but they produce essentially the same result so long as the alloys produced are of the same composition. Thus the invention is not limited to the specific production process.

Judgement as to whether or not the specimens produced are amorphous was based on the observations made by means of an X-ray diffraction method that the diffraction pattern shows no sharp peak inherent in crystals, in view of the fact that the constituent atoms of an amorphous alloy are arranged in a disorderly manner.

Figure 1:
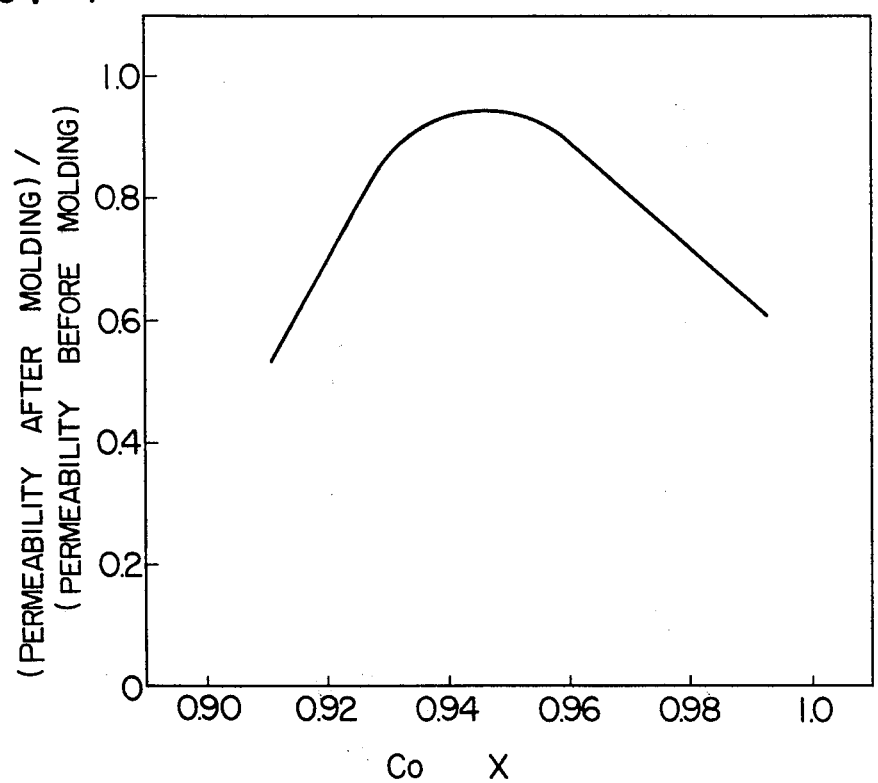
FIG. 1 is a diagram showing the relation between the amount of Co in the amorphous alloys according to the invention and a ratio of permeability after molding to that before molding.

FIG. 1 shows a change in permeability by molding in the $(Co_xFe_{1-x})_{0.74}Cr_{0.02}Si_{0.16}B_{0.08}$ alloy. There are possibilities that various stresses will be applied to the material as it is processed through steps for forming a head. For example, when the material is laminated by using a resin, stress of high magnitude is applied thereto as the resin sets, thereby deteriorating the magnetic characteristics of the material. To evaluate the deteriorating in characteristics occurring while the material is processed to produce a head, the change in permeability by molding is generally employed. Rings of an outer diameter of 5 mm and an inner diameter of 3 mm are obtained by punching from a specimen of amorphous alloy, and they are subjected to strain relief annealing carried out at 400° C. for 30 minutes followed by water cooling. After having been subjected to the strain relief annealing, they are insulated from layer to layer by insulating paper. Then a formal-insulated wire of 0.1 mm was wound 20 times therearound in troidal fashion, and the inductance was measured with a vector impedance meter, to determine the permeability of the specimen. The specimen was then immersed in the molding resin and allowed to set before its permeability was determined again. The values of permeability obtained before and after the molding were compared with each other. The frequency used for determining the permeability was 5 MHz. FIG. 1 shows the ratio of the permeability after the molding to that before the molding obtained when the x in the aforesaid general formula is varied. It may be said that nearer the ratio to 1.0, the better is the molding characteristic.

The resin used was one that contains, as its principal ingredient, Epikote 828 (trade name of a product by Shell Epoxy Co. Ltd. of the U.S.A.) which is commonly used for evaluating the resin molding characteristic of permalloy foil. Setting conditions were as follows: the sample was embedded in the resin which was placed in a vessel, and allowed to set at 80° C. for 2 hours after the vessel was evacuated by a rotary vacuum pump. Following setting, the specimen was allowed to stand at room temperature for over 24 hours.

Although the molding characteristic may vary slightly depending on the amounts of Cr and Si, the sample showed a good molding characteristic only when the value of x showed a change in a relatively narrow range or between 0.925 and 0.97. When the sample had a value of x out of this range, it showed a marked deterioration in magnetic characteristics when formed into a head, which is not desirable. It will be seen that the deterioration in magnetic characteristics that might occur in the material due to working done for producing a head would place limitations on the composition of the amorphous alloys according to the invention. More specifically, the value of x in the composition is preferably in the range between 0.93 and 0.95, and the peak position in the ratio of the permeability after molding to that before molding exists in this range of the values of x even if the amounts of Cr and Si show variations.

Example 2

Figure 2:
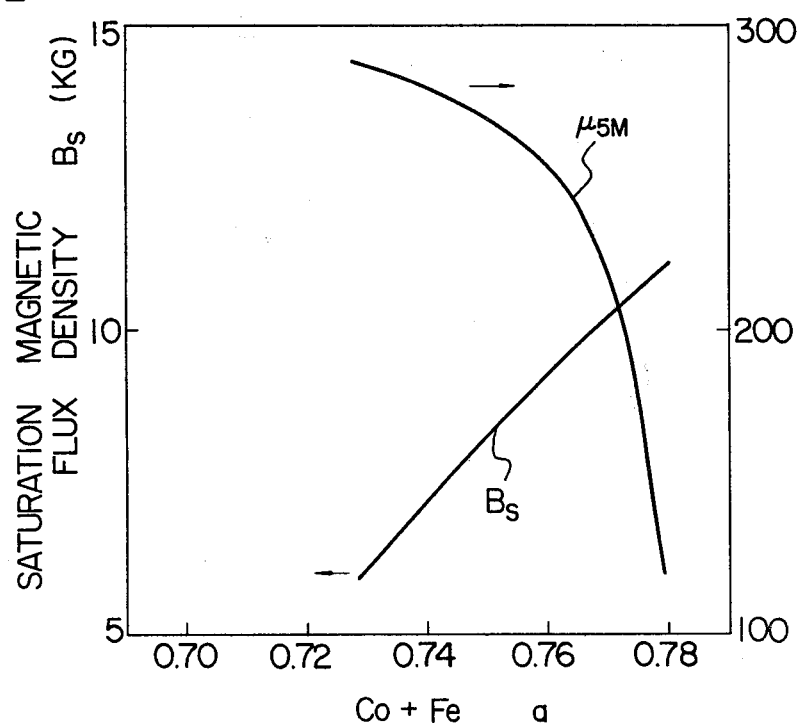
FIG. 2 is a diagram showing the relation between the total of the amount of Co and the amount of Fe in the amorphous alloys according to the invention, the saturation magnetic flux density and the permeability at 5 MHz.

FIG. 2 shows the saturation magnetic flux density $B_s$ and the permeability $\mu_{5M}$ at 5 MHz of the $(Co_{0.94}Fe_{0.06})_aCr_{0.02}Si_{0.82-d}B_{0.16}$ alloy in relation to the value a of (Co+Fe). Specimens of the amorphous alloy were prepared in the same manner as desirable by referring to Example 1. The saturation magnetic flux density was determined on a disk-shaped sample of 3 mm by using a vibrating sample magnetometer with an external magnetic field 4KOe. As subsequently to be sescribed, the value of permeability may vary depending on the thickness of a specimen. However, the value shown is of the highest level obtained by subjecting a specimen of about 30 μm thick to suitable heat treatment. Typical heat treatment for the $(Co_{0.94}Fe_{0.06})_{0.74}Cr_{0.02}Si_{0.06}B_{0.18}$ alloy consists in heating at 475° C. for 5 minutes followed by cooling with water. The maximum heat treating condition which may vary depending on the composition of an alloy consists generally in heating for 5–6 minutes at a temperature in the range between 350° and 500° C. at which no crystallization takes place. In FIG. 2, an increase in the value of a causes an increase in the saturation magnetic flux density $B_s$ and a decrease in permeability $\mu_{5M}$. Ferrite base materials hitherto used for producing magnetic heads have had a maximum saturation magnetic flux density of no higher than 5 KG. It is necessary, therefore, for a new material for magnetic heads to have a saturation magnetic flux density of at least over 5 KG. It is generally considered desirable that a material for producing magnetic heads for use with metal powder tape of high coercive force should have a saturation magnetic flux density of over about 7 KG. The range of the values of a that satisfies this condition, which may vary depending on the amounts of Cr and Si, is about a $\geq 0.74$.

The higher the permeability $\mu_{5M}$, the more desirable. However, there is no definite condition that should be satisfied for head characteristics, for the reasons that (i) conventional materials show a deterioration in permeability during working, and (ii) the efficiency of the head is not proportional to permeability and saturation occurs when its value exceeds a certain level. However, research conducted by us has shown that material for producing magnetic heads preferably have a permeability of over 250 on a frequency of 5 MHz and that the performance of the heads shows a sudden drop when the value is below 200, as evidenced by recording and reproducing characteristics. The range of the values of a that meets this condition is a $\leq 0.76$.

Example 3

Figure 3:
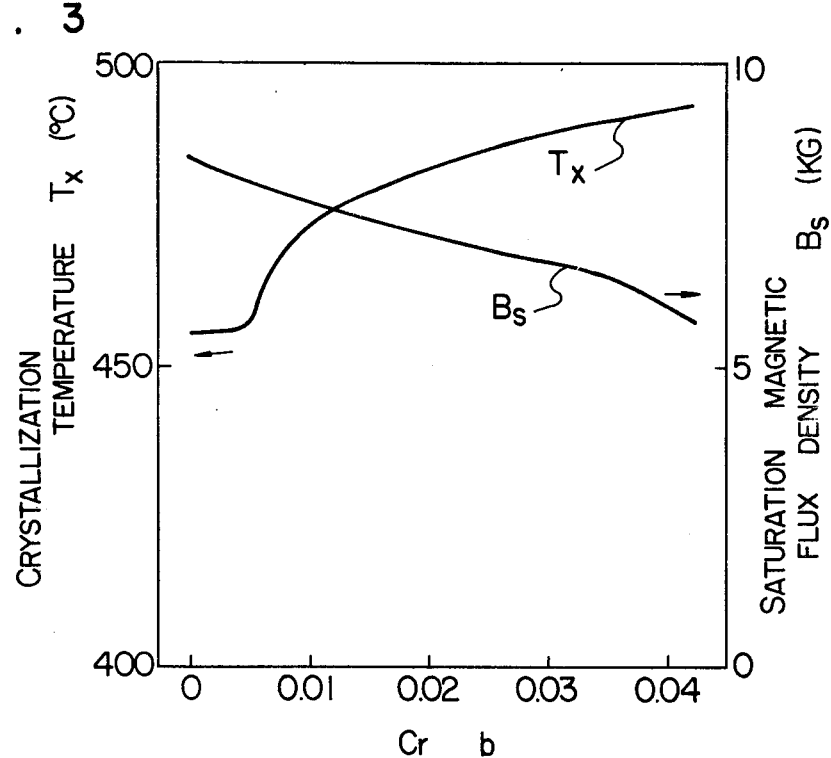
FIG. 3 is a diagram showing the relation between the amount of Cr in the amorphous alloys according to the invention, the crystallization temperature and the saturation magnetic flux density.

Cr raises the crystallization temperature of an amorphous alloy, so that the element increases the reserve of the material for copying with a rise in temperature caused by working done on it for producing a head. Thus the element has effects in facilitating working and increasing the stability of the characteristics of the head. Generally a small amount of transistion metal elements have the same tendency, and Cr, V and Mo, particularly Cr, have marked effect. However, it is impossible to add a large amount of transition metal elements, because they cause a sudden drop to occur in saturation magnetic flux density. FIG. 3 shows the crystallization temperature $T_x$ and the saturation magnetic flux density $B_s$ of the $(Co_{0.94}Fe_{0.06})_{0.76-b}Cr_bSi_{0.16}B_{0.08}$ alloy in relation to the value of b of Cr. Specimens of the amorphous alloy were prepared in the same manner as described by referring to Example 1. It is necessary that addition of Cr have the value b of over 0.005 to have any effect, and it is necessary that b<0.03 to enable the saturation magnetic flux density to exceed about 7 KG, although the value of b may vary depending on the amounts of Si and B. Cr has the effects of increasing the corrosion resistance of specimens of amorphous alloys and facilitating preparation thereof, so that it is a desirable element when viewed from a general standpoint. When a specimen of an amorphous alloy containing no Cr is allowed to stand in air atmosphere at an elevated temperature (about 400° C.), for example, such specimen will undergo oxidation. However, addition of Cr to bring the value of b to 0.02 reduces this tendency in the specimen. It often happens that even if a specimen of an amorphous alloy added with no Cr only has a thickness of about 20 $\mu$m, it is possible to obtain a specimen of such alloy of a thickness of about 30 $\mu$m by adding Cr to bring the value of b to 0.02. When $b \geq 0.01$, addition of Cr is more preferable because, as shown in FIG. 3, crystallization temperature is markedly raised by the addition of the element. Moreover, a specimen containing no Cr is low in corrosion resistance. When chemicals, such as a grinding solution, are employed d during the process of working the specimen to produce a head or the specimen is immersed in water over a prolonged period, the specimen suffers nonhomogeneous corrosion. In a specimen containing over about 1% (or the value of b is 0.01) of Cr has no such problem. Addition of Cr facilitates the production of an amorphous state, so that the surface characteristic of a specimen is improved. When a specimen has a poor surface characteristic, the laminating rate of the specimen is reduced and its effective saturation magnetic flux density is lowered when a magnetic head is produced as by lamination of the amorphous alloy. Thus it is practically important that the specimen have a good surface characteristic.

Example 4

Figure 4:
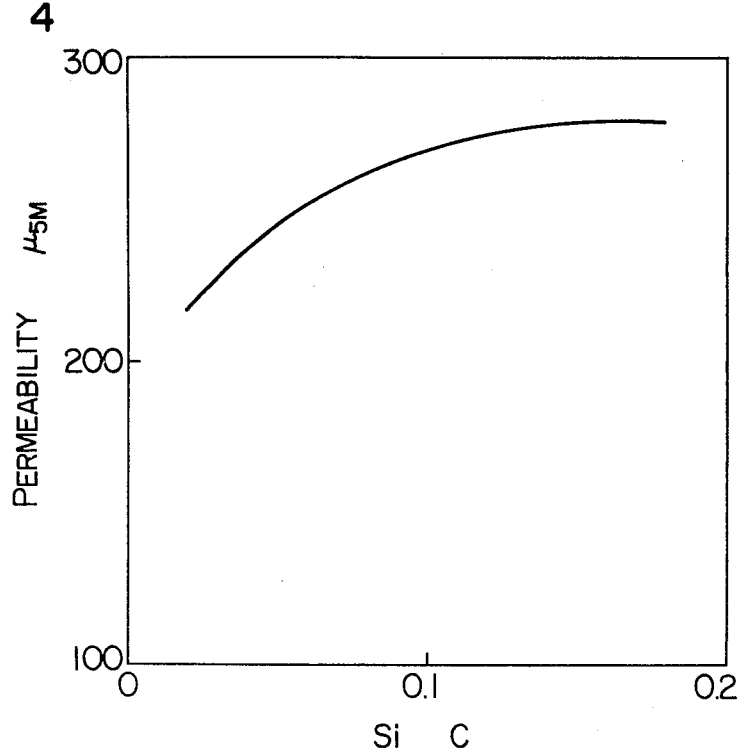
FIG. 4 is a diagram showing the relation between the amount of Si in the amorphous alloys according to the invention and the permeability at 5 MHz.

Si is an important element for producing an amorphous state, and it is possible to readily prepare a specimen of an amorphous alloy when the value of c is in the range between 0.02 and 0.18, although the value may vary depending on the amounts of Cr and B. The range of the values of c enabling a relatively high permeability ($\mu_{5M}$ of over 250) is between 0.06 and 0.18. FIG. 4 shows the relation between the permeability at 5 MHz and the value of c with regard to specimens of a thickness of about 30 $\mu$m of the $(Co_{0.94}Fe_{0.06})_{0.74}Cr_{0.02}Si_cB_{0.24-c}$ alloy. The value shown represents the maximum value obtained by subjecting various specimens of the alloy containing different amounts of ingredients. The specimens of the amorphous alloy were prepared in the same manner as described by referring to Example 1.

Si is a desirable element for achieving high permeability. However, the element tends to lower the crystallization temperature when added in large amounts, so that addition thereof is not desirable for practical purposes in some cases. However, this tendency is relatively less marked when the value of c representing the amount of Si is below 0.14. When it is below 0.12, this tendency is negligible.

Besides Si, as elements aiding in creating an amorphous state Al, P, Ga, Ge, Sn and C are known. The results of experiments conducted by us show that the greatest effect is achieved by Si.

B is an element indispensable to produce an amorphous state. When added in the range specified in the invention, B enables an amorphous state to be relatively readily produced.

Example 5

An amorphous alloy is unstable and its magnetic characteristics tend to show changes because it represents an unbalanced phase. This tendency applies to all the amorphous alloys although there is a difference in degree between them due to alloy composition. Thus when any amorphous alloy is put to practical use, it is necessary that its use be carefully selected and the alloy be used for producing an article in which magnets aftereffect causes no problem.

Figure 5:
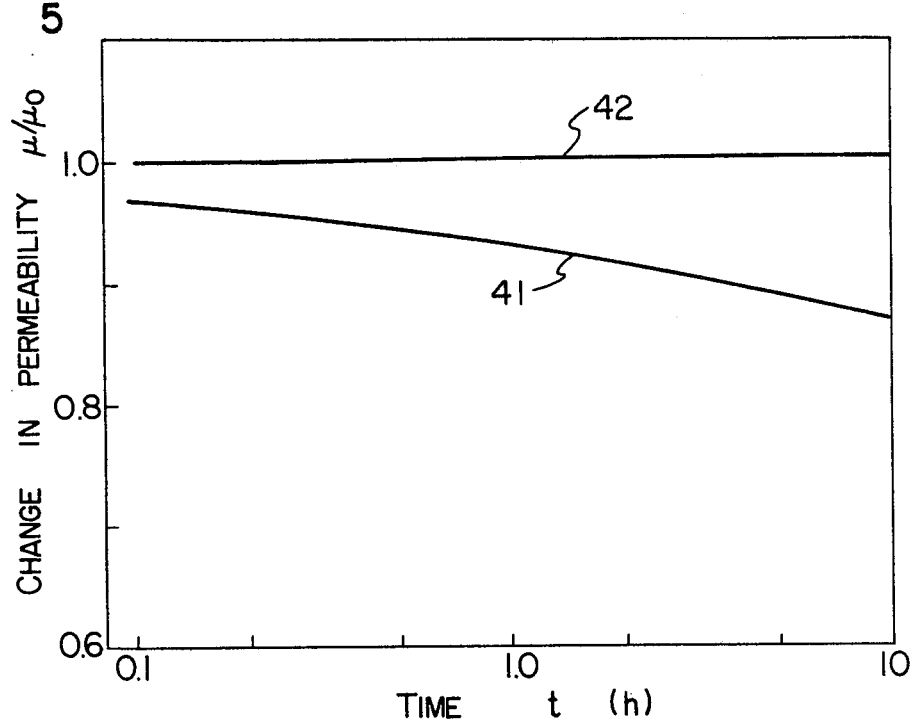
FIG. 5 is a diagram showing changes with time in the permeability exhibited by the amorphous alloys according to the invention.

FIG. 5 shows changes with time in permeability $\mu$ exhibited by the $(Co_{0.94}Fe_{0.06})_{0.74}Cr_{0.02}Si_{0.16}B_{0.08}$ alloy. Specimens prepared in the same manner as described by referring to Example 1 had their magnetic characteristics improved by subjecting them to heat treatment at 400° C. for 30 minutes and cooling them with water, and then aged at 100° C. FIG. 5 shows the ratio of the permeability $\mu$ of the specimen treated as aforesaid to the value $\mu_o$ obtained initially with these specimens. A curve 41 representing a specimen tested on a frequency f of 20 KHz shows that the permeability shows a steep drop with time, but a curve 42 representing a specimen tested on a frequency f of 5 MHz shows a very small change in permeability that can be neglected. This phenomenon is considered to be attributed to the fact that the mechanism of magnetization differs depending on the frequency range and that a change in the internal structure of an amorphous alloy hardly affects the permeability of the alloy in a high frequency range.

Figure 6:
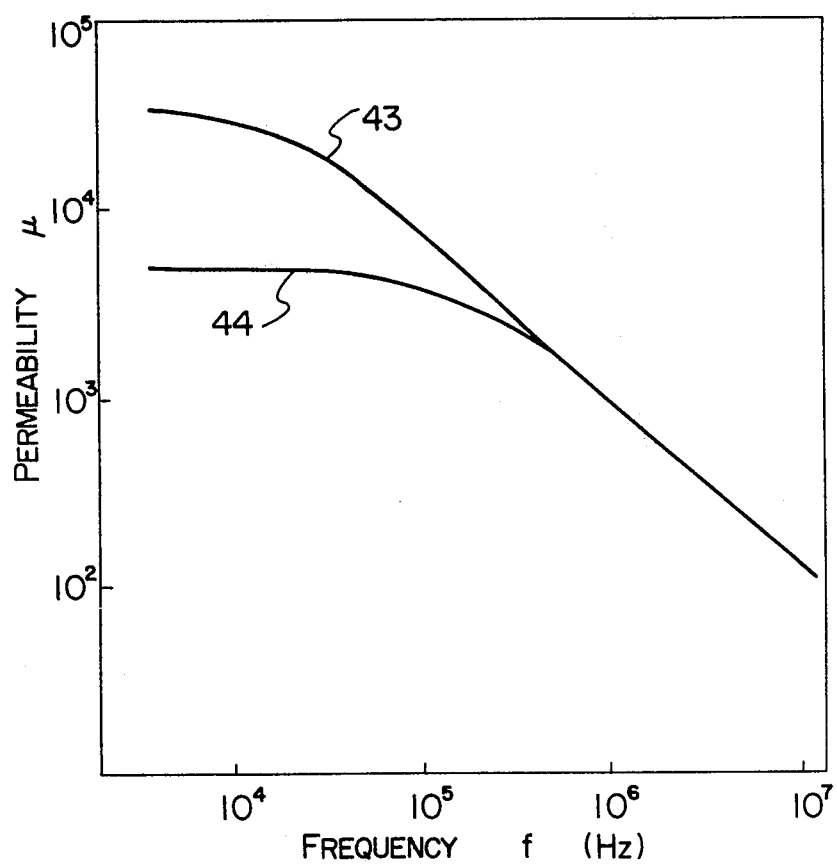
FIG. 6 is a diagram showing the frequency dependence of the permeability exhibited by the amorphous alloys according to the invention.

FIG. 6 shows the frequency dependence of permeability in specimen of alloys having the results of tests on permeability shown in FIG. 5. In FIG. 6, it will be seen that the change in permeability occurring with time due to low temperature aging of 150° C. for 100 hours is substantially negligible in a frequency range of over about 200 KHz. A curve 43 indicates the initial characteristic of the specimens, and a curve 44 indicates the characteristic obtained by aging at 150° C. for 100 hours. Thus it will be seen that it is difficult to use an amorphous alloy in magnetic heads of audio equipment used in a frequency range of below about 100 KHz and that such alloy can have application only in magnetic heads used in a frequency range of over 200 KHz. Application of amorphous alloy, for example, in video tape recorders for household and television transmission use could be realized.

Figure 7:
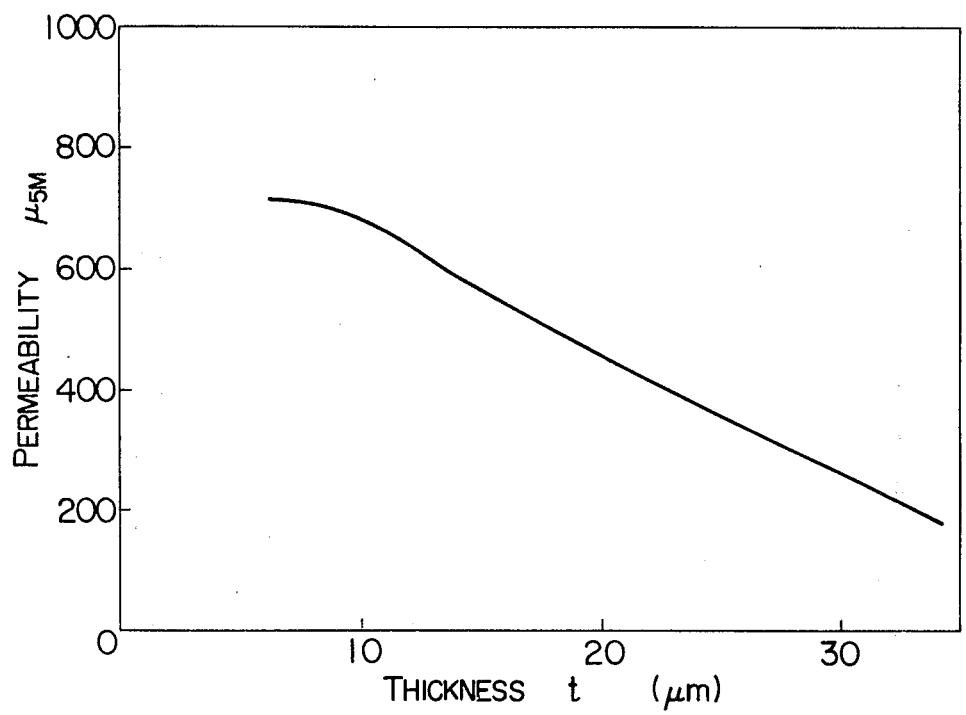
FIG. 7 is a diagram showing the relation between the thickness of the amorphous alloy in foil form according to the invention and the permeability.

In a frequency range over 200 KHz, the permeability of an amorphous alloy may vary depending on the thickness of specimens. This is because an eddy current loss increases in a high frequency range due to the specific resistance of the amorphous alloys according to the invention of about 130 $\mu\Omega$cm being relatively low, so that the eddy current loss rapidly increases with an increase in the thickness of the specimens and lowers the effective permeability. FIG. 7 shows changes in permeability $\mu_{5M}$ at 5 MHz taking place when the thickness t ($\mu$m) of the $(Co_{0.94}Fe_{0.06})_{0.74}Cr_{0.02}Si_{0.16}B_{0.08}$ alloy in the form of foils. It will be seen that to obtain a permeability of over 250 requires the production of a specimen of a thickness below 30 $\mu$m. When a plurality of foils of the alloy are laminated in actual practice for producing a head, it is necessary that an electrically insulating layer of much higher resistance than the specific resistance of the alloy be interposed between the adjacent layer of foils. When the single foil has a very small thickness, difficulties would be experienced in forming a lamination, so that for practical purposes the foils should have a suitable thickness. Because the thickness of the specimens is limited by the production process, it is considered proper that a single sheet of specimen be over several μm in thickness.

Table 1 shows the typical characteristics of the amorphous alloys according to the invention, and compares such characteristics with those of magnetic head materials of the prior art. The specimens tested on for obtaining the data shown in Table 1 had a thickness of 30 μm, and the tests for permeability were conducted at 5 MHz. The values shown are those obtained by subjecting the specimen to heat treatment in optimum condition.

TABLE 1

| Composition (at. %) | Crystallization Temp. (°C.) | Permeability (μ 5M) | Saturation Magnetic Flux Density (KG) | Optimum Heat Treatment Condition |
|---|---|---|---|---|
| $(Co_{0.94}Fe_{0.06})_{74}Cr_2Si_{16}B_8$ | 482 | 280 | 7.6 | 400° C., 30 min. |
| $(Co_{0.94}Fe_{0.06})_{75}Cr_{0.5}Si_{11}B_{13.5}$ | 510 | 290 | 8.6 | 450° C., 10 min. |
| $(Co_{0.94}Fe_{0.06})_{74}Cr_2Si_6B_{18}$ | 516 | 250 | 8.6 | 480° C., 5 min. |
| Mn—Zn Ferrite | — | 400–700 | <5 | — |
| Thin Sen-Alloy Strip | — | <200 | 7–10 | — |

Example 6

Video magnetic heads were produced by using an amorphous alloy according to the invention having the composition $(Co_{0.94}Fe_{0.06})_{0.74}Cr_{0.02}Si_{0.16}B_{0.08}$. Foils of the amorphous alloy were prepared by the same method as described hereinabove. Each foil had a thickness of about 27 μm and was subjected to heat treatment at 400° C. for 30 minutes followed by cooling with water. The magnetic heads produced were of two types: one type was a straight type having no cutouts as shown in a plan view in FIG. 8a and in a sectional view in FIG. 8c and the other type was a narrow track type shown in FIG. 8b in a plan view and in FIG. 8c in a sectional view.

Figure 8A:
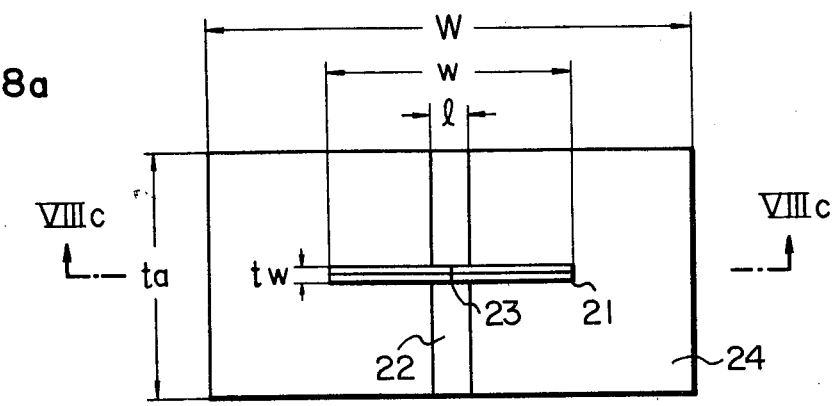
FIG. 8a is a plan view of the magnetic head comprising one embodiment of the invention.
Figure 8B:
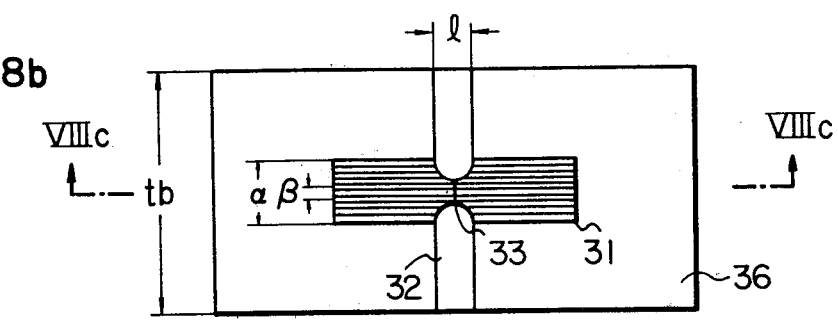
FIG. 8b is a plan view of the magnetic head comprising another embodiment of the invention.
Figure 8C:
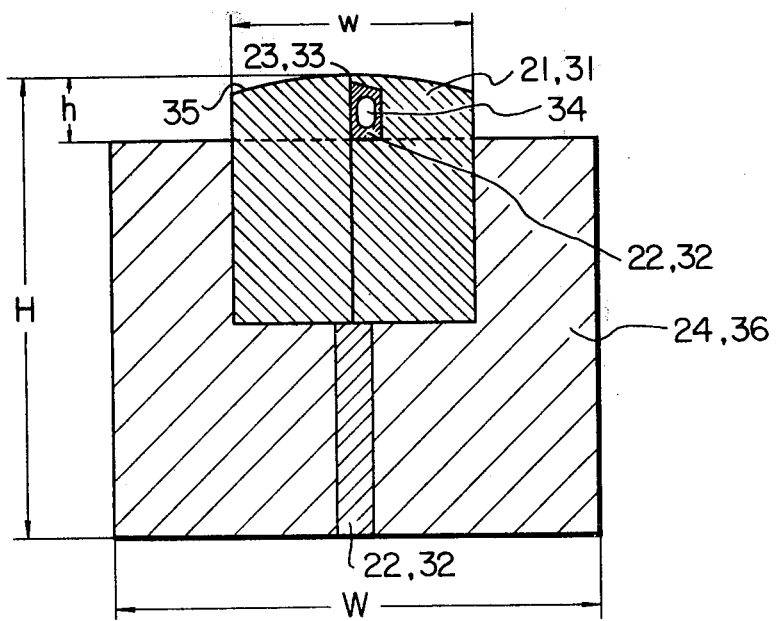
FIG. 8c is a sectional view taken along the line VIIIc—VIIIc shown in FIGS. 8a and 8b.

The magnetic head of the straight type shown in FIG. 8a and in FIG. 8c in a cross section taken along the line $VIII_c$—$VIII_c$ in FIG. 8a is of the construction wherein the surface of the amorphous alloy adapted to come into sliding engagement with a magnetic recording medium or the surface thereof facing the magnetic tape has a width tw which is substantially uniform for regulating the track width by the width tw. In FIGS. 8a and 8c, the numerals 21, 22, 23, 24, 34 and 35 designate amorphous alloy foils, an adhesive, a gap, a protecting material, an opening for a coil (window) and a surface facing the magnetic recording medium, respectively. The foils were two in number and superposed one over the other. The straight type magnetic head had the following dimensions: ta, 1.5 mm, tw, 58 μm; l, 0.2 mm; w 2.3 mm; and W, 2.3 mm. In FIG. 8c, H and h are 4.7 and 1 mm, respectively.

In the magnetic head of the narrow track type shown in FIGS. 8b and 8c, the surface of the amorphous alloy facing the magnetic recording medium has a width which is broadened (a width α) in portions thereof except for a portion in the vicinity of the gap 23 having a width β which is smaller, so that the track width can be regulated by the width β of the narrow portion of the amorphous alloy. In FIG. 8b and FIG. 8c in a cross section taken along the line $VIII_c$—$VIII_c$ in FIG. 8b, the numerals 31, 32, 33, 34, 35 and 36 designate amorphous alloy foils, an adhesive, a gap, an opening for a coil (window), a surface facing the magnetic recording medium, and a protective material, respectively. The amorphous alloy foils are a plural in number and superposed one over another. In FIGS. 8b and 8c, the narrow track type magnetic head has the following dimensions: tb, 1.5 mm; β, 5.8 μm; l, 0.2 mm; w, 2.3 mm; W, 4.5 mm; H, 0.2 mm; and h, 1 mm.

In FIGS. 8a, 8b and 8c, the coil is omitted for simplicity. However, actually, the coil is wound on the core through the opening 34.

In producing the magnetic heads of the aforesaid constructions, the protective material (which is non-magnetic ferrite in this embodiment) of the predetermined shape was formed with a groove for receiving the amorphous alloy foils (superposed one over another in this embodiment). The amorphous alloy foils were inserted in the groove and secured in place with the adhesive to obtain two halves of the core provided with the protective material, which were bonded together with the adhesive. The coil was wound on the magnetic core through the opening for the coil [in this embodiment, the opening for the coil was formed in one of the two halves of the core as shown in FIG. 8c]. A portion of the magnetic head corresponding to the surface facing the magnetic recording medium was finished by grinding to have a predetermined configuration after the two halves were joined into the core.

In producing the magnetic head of the aforesaid constructions, the adhesive used was a mixture of Epikote 828 (trade name of Shell Epoxy Co. Ltd. of U.S.A.) which is an adhesive of the epoxy base, HN 2200 (trade name of Hitachi Kasei Ltd. of Japan) which is an acid anhydride setting agent, and 1.2 DMI (trade name of BASF AG of West Germany) which is a setting promoter containing 1.2 dimethyl imidazol. The adhesive concurrently serves as an insulating agent for electrically insulating the layers of the amorphous alloy. It has been found that low melting point glass can be used as an adhesive. Particularly, lead glass may be advantageously used because its melting point and coefficient of thermal expansion are substantially similar to those of the amorphous alloy foils of this embodiment. Formation of the gap was effected by sputtering $SiO_2$. It is to be understood that the invention is not limited to this specific method of producing magnetic heads. The head characteristics were tested by providing a winding of a copper wire of 40 μm in diameter with an insulating coat wound in 15 turns and by using magnetic tapes travelling at a speed of 5.8 m/S. The tapes used in the tests include a $\gamma$-$Fe_2O_3$ tape (coercive force, about 700 Oe; residual magnetic flux density, about 1200 G, produced by Hitachi Maxcell Ltd., Japan) referred to as Co-$\gamma Fe_2O_3$ which is now in use with household VTRs, and a metal powder tape (coercive force, about 1240 Oe, residual magnetic flux density, about 3000 G, produced by Hitachi Maxcell Ltd., Japan) which is expected to be used in the future. For comparing the characteristics of the heads according to the invention with those of heads of the prior art, a Mn-Zn ferrite head now in use was used in the test.

Figure 9:
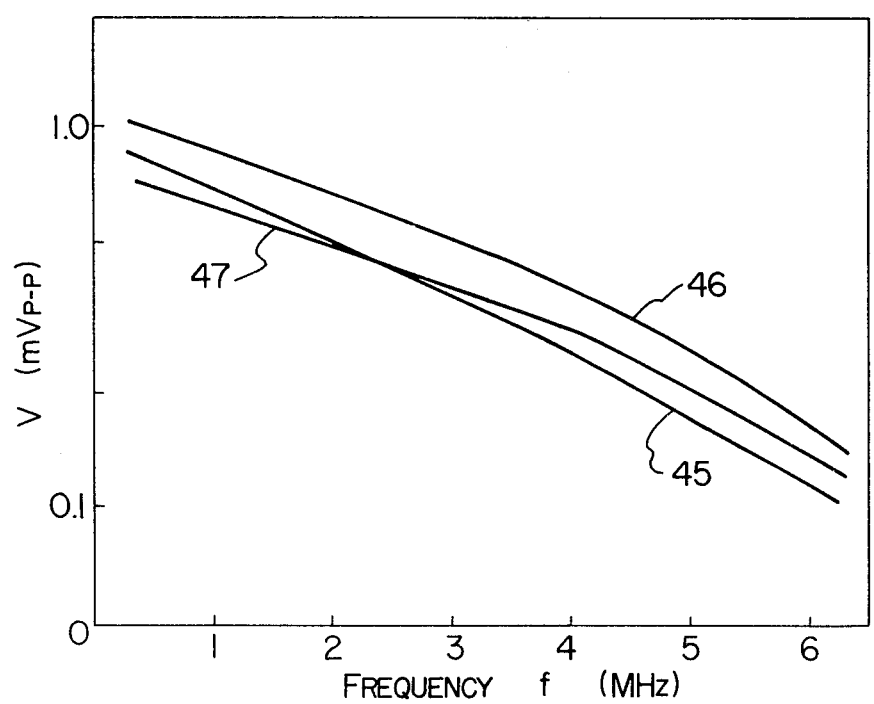
FIG. 9 is a diagram showing the frequency dependence of read and write characteristics of the magnetic head according to the invention and a magnetic head of the prior art.

FIG. 9 shows the frequency dependence of the recording and reproducing characteristics V (mVp−p) of magnetic heads tested with a γ-Fe$_2$O$_3$ tape. The effective gap lengths of these heads were about 0.4 μm (amorphous alloy) and about 0.5 μm (ferrite). The track width varied from head to head, so that the track heads are shown by converting to 58 μm using the ferrite head as a reference. The characteristics of the straight type head using an amorphous alloy according to the invention (curve 45) is slightly inferior to that of the ferrite head. However, the characteristic of the narrow track type head using an amorphous alloy according to the invention (the ratio β/α or the ratio of the track width to the core thickness of about 0.333) indicated by a curve 46 is superior to that of the narrow track type ferrite head (the ratio β/α of about 0.429) indicated by a curve 47.

Figure 10:
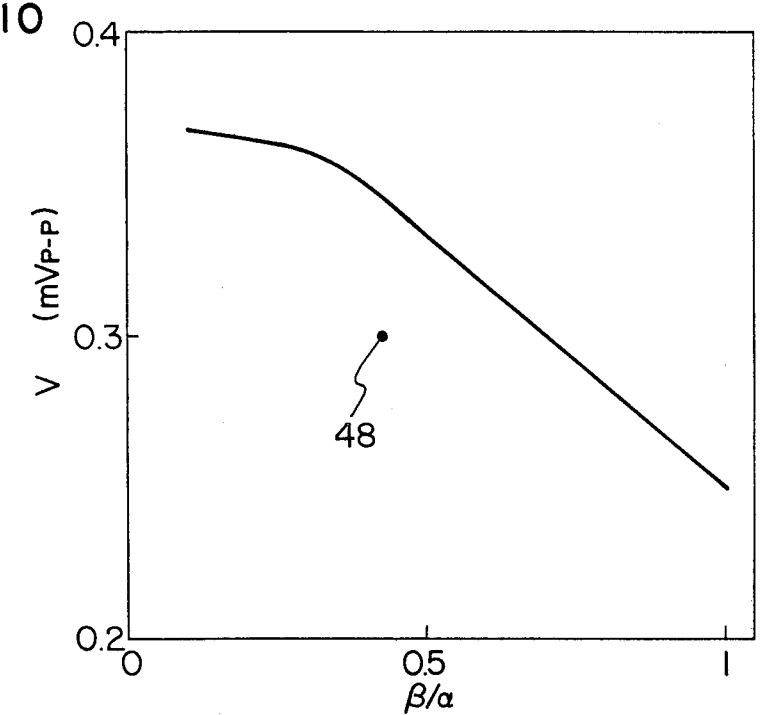
FIG. 10 is a diagram showing the influences exerted by the ratio of the track width to the magnetic core thickness on the magnetic head of the narrow track type incorporating therein the present invention.

FIG. 10 shows the relation between the recording and reproducing characteristics V(mVp−p) and the ratio β/α, obtained in tests conducted on 4.1 MHz by varying the ratio β/α of the narrow track type amorphous alloy head and using a γ-Fe$_2$O$_3$ tape. A point 48 indicates the value of the Mn-Zn ferrite head. In the figure, it will be seen that the characteristic suddenly improves as the ratio β/α becomes smaller than unity. It has been found that the ratio β/α should be below about 0.7 to let the characteristic of the amorphous alloy head exceed the characteristic of the ferrite head (recording and reproducing characteristics of about 0.3 mV$_{p-p}$ at 4.1 MHz).

In the narrow track type magnetic head using a Mn-Zn ferrite of the prior art, recording and reproducing characteristics V showed almost no change even if the ratio β/α was varied (since β is a track width which is predetermined, α was varied). To enable the core to have enough strength and permit the head to come into intimate contact with the tape, the ratio β/α was made to 0.429.

Figure 11:
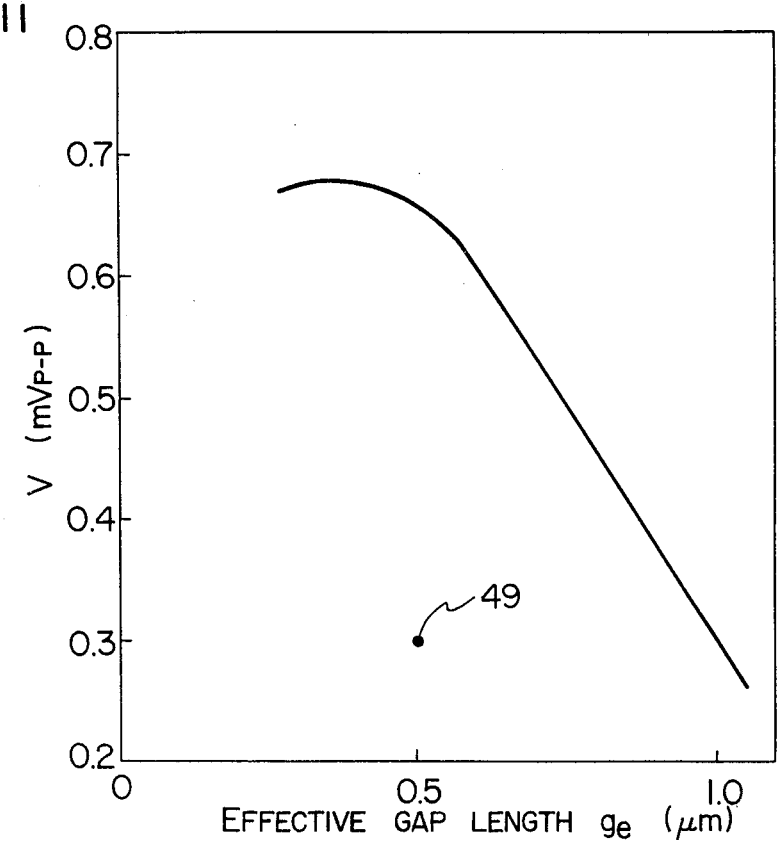
FIG. 11 is a diagram showing the relation between the effective gap length and the read and write characteristics in the magnetic head of the narrow track type incorporating therein the present invention.

FIG. 11 shows the recording and reproducing characteristics V of the narrow track type head of amorphous alloy (β/α of about 0.333) obtained at 4.1 MHz by varying the effective gap length gb*. The tests were conducted with a metal powder tape. It will be seen that the effective gap length should be below about 1.0 μm, to let the recording and reproducing characteristics of this type of head exceed the recording and reproducing characteristics of the Mn-Zn ferrite head used with a γ-Fe$_2$O$_3$ tape (about 0.3 mV$_{p-p}$ as indicated by a point 49 in FIG. 11). It will also be seen in FIG. 11 that the smaller the effective gap length, the higher are the characteristics. For example, by rendering the effective gap length below 0.6 μm, for example, better results can be achieved. The smaller the gap length, the more difficult it becomes to form the gap, and the head has an optimum gap length value compatible with the characteristics of the tape. For practical purposes, a suitable value or a value necessary for design may be selected for the gap length.

Table 2 shows the output/noise ratios of a Mn-Zn ferrite head of the prior art and the amorphous alloy head of the narrow track type (β/α of about 0.333 and effective gap length gb* of about 0.5 μm). A combination of the ferrite head with a metal powder tape provided no improvement in output noise ratio, so that there is no advantage in this combination. However, a combination of the amorphous alloy head with a metal powder tape provided an improvement of about 2 dB in output/noise ratio, which represents an improvement of 4 dB over the ferrite head. It will be seen that the invention has effect in improving the output/noise ratio. The effect achieved stems from selection of a suitable alloy composition and a suitable head construction.

TABLE 2

| | Output/Noise Ratio | |
|---|---|---|
| | γ-Fe$_2$O$_3$ Tape | Metal Powder Tape |
| Amorphous Alloy Head | 36 dB | 38 dB |
| Mn—Zn Ferrite Head | 34 dB | 34 dB |

Parts of the magnetic head according to the invention not described specifically are those known in the art.

Figure 12:
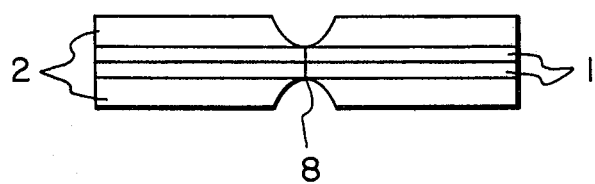
FIGS. 12 and 13 are plan views showing modifications of the construction of the magnetic head in the vicinity of the gap according to the invention.
Figure 13:
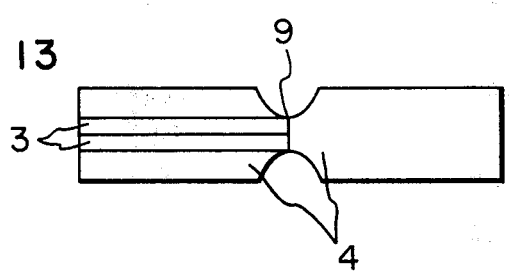

Recording and reproducing are largely effected in the vicinity of the gap formed in the head. Thus by using an amorphous alloy for forming only a portion of the head in the vicinity of the gap, it is possible to achieve the effect that can be achieved by forming the core entirely of an amorphous alloy. Thus as shown in FIG. 12 that shows one example of the principal portion of the surface facing the magnetic tape, the magnetic head may be formed not only of an amorphous alloy 1 but also other magnetic material, such as a Mn-Zn ferrite 2. The numeral 8 in FIG. 12 designates a gap. As shown in FIG. 13, a portion of the head located on one side of the gap 9 may be formed of an amorphous alloy 3 and a portion thereof on the other side thereof may be formed of a Mn-Zn ferrite 4.

Figure 14:
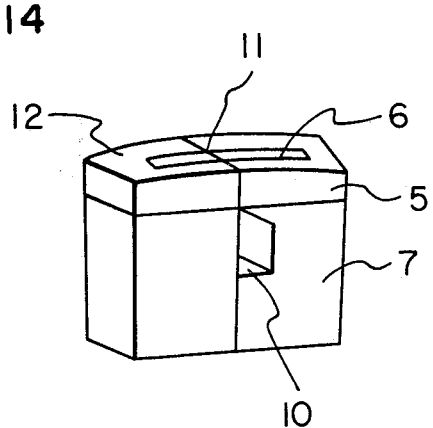
FIG. 14 is a perspective view showing still another construction of the magnetic head according to the invention.

FIG. 14 shows another modification which is a magnetic head of a composite construction. A non-magnetic material (nonmagnetic ferrite, for example) 5 both serves as a protector and supporter for an amorphous alloy 6 and provided improvements in wear resistance.

It is possible to improve the efficiency of the head in reproduction by using a material 7 of high permeability, such as Mn-Zn ferrite, singly or in combination with an amorphous alloy, for the back core. In FIG. 14, the numerals 10, 11 and 12 designate an opening for the coil, a gap and a surface facing the magnetic recording medium (which is a surface with which the magnetic head is brought into sliding contact), respectively.

The amorphous alloys have excellent magnetic characteristics as set forth hereinabove, but they are slighly inferior in wear resistance to conventional materials for producing magnetic heads.

Table 3 shows the wear resistance characteristics of the amorphous alloy, Sen-alloy, Mn-Zn ferrite and the composite of Mn-Zn ferrite and amorphous alloy (of the construction shown in FIG. 12) with respect to γ-Fe$_2$O$_3$ tape. Tests were conducted under the following conditions: contact range between material and tape, 250 μm (constant); humidity, 60%; relative velocity, 14 m/S; and duration, 20 hours. The results are shown in the amounts of wear relative to the amount of wear of the Sen-alloy. Amorphous alloys being low in wear resistance when used singly, magnetic heads formed thereof are short in service life. However, by combining a suitable other material with an amorphous alloy to provide a composite material for forming a magnetic head as shown in FIG. 12, for example, it is possible to reduce the wear caused on the amorphous alloy portion to the same level as that caused on the ferrite portion.

TABLE 3

| Material | Sen-alloy | Mn—Zn Ferrite | Amorphous Alloy (Single Body) | | Composite of Mn—Zn Ferrite and Amorphous Alloy |
|---|---|---|---|---|---|
| | | | $(Co_{0.94}Fe_{0.06})_{0.74}Cr_{0.02}Si_{0.16}B_{0.08}$ | $(Fe_{0.9}Cr_{0.1})_{0.76}Si_{0.09}B_{0.15}$ etc. | |
| Wear | 1 | 0.2 | 1–2 | About 0.8 | 0.2 |

As materials to be combined with amorphous alloys for increasing the wear resistance of the magnetic heads, ferrite materials (Mn-Zn ferrite, nonmagnetic ferrite, etc.) are desirable because of their high wear resistance. However, Sen-alloy of high wear resistance and amorphous alloys of high wear resistance may also be used. One example of the amorphous alloys of high wear resistance is a Fe-Cr-Si-B alloy, for example. In addition to using the processes shown in FIGS. 12, 13 and 14 for combining an amorphous alloy with other material, any other known process may be used.

When an amorphous alloy is incorporated in a magnetic head, it may become necessary to adapt the head construction to practical use by a known process, as by forming an azimuth angle of the head gap. It is to be understood that such adaptation falls within the scope of the invention.

Preferred embodiments of the invention have been described with reference to a magnetic head using amorphous alloy foils prepared by a single roll process. It is to be understood that the results similar to the results achieved by this type of magnetic head can be achieved by a magnetic head using an amorphous alloy prepared by sputtering. When the amorphous alloy prepared by sputtering is formed into layers, an insulating material, such as $SiO_2$, may be sputtered on the surface of a layer of amorphous alloy and apply another layer of amorphous alloy by sputtering thereon without using an adhesive, and this process may be repeated, to obtain a plurality of layers of amorphous alloy. When sputtering is relied on, it is necessary to use a substrate. When the substrate is not desirable for producing a head, the amorphous alloy or its composite with other material formed by sputtering can be separated from the substrate by selecting a suitable material for the substrate.

Since numerous changes and different embodiments of the invention may be made without departing from the spirit and scope thereof, it is intended that all matter contained in the description shall be interpreted as illustrative and not in limiting sense.

What is claimed is:

1. A magnetic head for video equipment comprising two members of magnetic material of high permeability juxtaposed against each other with a gap existing therebetween and having at least a portion in the vicinity of the gap of at least one of said members formed of an alloy in the form of at least one foil, said alloy foil being essentially amorphous, having a thickness of below 30 μm and having a composition expressed by a general formula $(Co_xFe_{1-x})_aCr_bSi_cB_{1-a-b-c}$ wherein the value of x is in the range between 0.925 and 0.97, the value of a is in the range between 0.74 and 0.76, the value of b is in the range between 0.005 and 0.03, and the value of c is in the range between 0.06 and 0.18, and wherein $a+b+c \leq 0.94$.

2. A magnetic head for video equipment as claimed in claim 1, wherein the value of x is in the range between 0.93 and 0.95.

3. A magnetic head for video equipment as claimed in claim 1, wherein the value of b is in the range between 0.01 and 0.03.

4. A magnetic head for video equipment as claimed in claim 1, wherein the value of c is in the range between 0.06 and 0.14.

5. A magnetic head for video equipment as claimed in claim 4, wherein the value of c is in the range between 0.1 and 0.12.

6. A magnetic head for video equipment as claimed in claim 1, wherein the sum of the values of a, b and c is in the range $a+b+c \leq 0.90$.

7. A magnetic head for video equipment as claimed in claim 1, wherein a portion of the head in the vicinity of the gap is formed of a plurality of alloy foils electrically insulated from each other.

8. A magnetic head for video equipment as claimed in claim 1, wherein said head has a track width which is below 0.7 time the thickness of a magnetic core in the vicinity of the gap.

9. A magnetic head for video equipment as claimed in claim 1, wherein said gap has an effective gap length which is below 1.0 μm.

10. A magnetic head for video equipment as claimed in claim 9, wherein said gap has an effective gap length which is below 0.6 μm.

11. A magnetic head for video equipment as claimed in any one of claims 1–10, wherein said predominantly amorphous alloy is subjected to heat treatment at a temperature above 350° C. and below its crystallization temperature.

12. A magnetic head for video equipment as claimed in claim 1, wherein at least one portion of at least one of said two members of high permeability except for the portion in the vicinity of said gap is formed of at least one material selected from the group consisting of crystallizable materials of high permeability and materials of high wear resistance.

13. A magnetic head for video equipment as claimed in claim 1, wherein a plurality of alloy foils are arranged in a straight-type construction and provide a surface facing a magnetic recording medium and having a width which is substantially uniform.

14. A magnetic head for video equipment as claimed in claim 1, wherein a plurality of the alloy foils are arranged in a narrow track-type construction providing a surface facing a magnetic recording medium and having a width which is broadened in portions thereof except for the portion in the vicinity of the gap which has a width which is smaller.

15. A magnetic head for video equipment as claimed in claim 13 or claim 14, wherein said plurality of alloy foils are electrically insulated from each other and are positioned perpendicularly to the surface facing the magnetic recording medium in a groove formed in a protective material comprised of non-magnetic ferrite.

* * * * *